UNITED STATES PATENT OFFICE.

WILLIAM GEORGE CLARK, OF GEELONG, VICTORIA, AUSTRALIA.

METHOD OF COPPERIZING IRON.

1,014,454.  Specification of Letters Patent.  Patented Jan. 9, 1912.

No Drawing.  Application filed June 9, 1909.  Serial No. 501,142.

*To all whom it may concern:*

Be it known that I, WILLIAM GEORGE CLARK, a subject of the King of Great Britain, residing at Albert Coffee Palace, Geelong, in the State of Victoria, Commonwealth of Australia, metal-worker, have invented an Improved Method of Copperizing Iron, of which the following is a specification.

According to this invention iron in its usual commercial forms such as tubes, sheets, bars, wire, etc., may be conveniently and uniformly coated with copper for industrial purposes. In order to attain this result the iron is first immersed in a bath or tank of a "pickling" solution of sulfuric, nitric, hydrochloric or equivalent acid made in the approximate proportion of 1 of acid to 10 of water. The iron is then if necessary scrubbed or rubbed until it presents bright surfaces and it is then removed from the pickling bath and transferred to a second bath or tank containing an acidified solution of copper sulfate. It is allowed to remain in the second bath until the desired coating of copper is deposited thereon, which operation usually requires about ten minutes. A solution which has been found very efficacious and suitable for this coating process consists approximately of the following ingredients in the proportions stated;—

| | |
|---|---|
| Copper sulfate | 1 part. |
| Sulfuric acid | 2 parts. |
| Boracic acid | ⅓ part. |
| Water | 18 parts. |

The iron is then removed from the second bath and is allowed to dry when it is passed through a furnace heated to the melting point of copper. On emerging from the furnace it is plunged into a bath of flux (boracic acid) conveniently arranged on the other side of the furnace, and having been allowed to cool down, what small amount of film that may have stuck to the iron is broken off with the result that the iron is uniformly covered with an even coating of copper. The boracic acid may be either in a molten or dry state, and while I find the dry state more economical in most cases, such as when coating tubes, wires and the like it is somewhat inconvenient in the case of thin sheets, nails, etc. With thin sheets they are preferably heated and then removed from the furnace so that any dirt which may happen to be attached thereto may be knocked off and the sheets again passed through the furnace and its bath of molten flux, or if preferred the flux may be sprinkled on the surfaces before their introduction into the furnace. With nails, screws and such small articles they are usually placed on a tray containing the flux and after being passed through the furnace are removed and allowed to cool in a bath of dry flux.

Having now particularly described and ascertained the nature of my said invention and in what manner the same is to be performed, I declare that what I claim is;—

1. The herein described method of copperizing iron, consisting in immersing the iron in a pickling solution and rubbing the same until it presents bright surfaces, transferring the iron to a second bath containing an acidified solution of copper sulfate and allowing it to remain in the latter until the desired coating of copper is deposited thereon, removing the copper coated iron from the second bath and drying the same and then passing the coated iron through a furnace heated to the melting point of copper, and finally plunging the coated iron into a bath of boracic acid flux immediately on the removal of said coated iron from the furnace.

2. The herein described method of copperizing iron, consisting in immersing the iron in an acid pickling bath and rubbing the same until a bright surface appears, then immersing the iron in a solution of copper sulfate, drying the iron after it is fully coated with copper sulfate, then heating the copper coated iron in a furnace to the melting point of copper, removing dirt therefrom, and then passing the iron through the furnace in conjunction with a flux of boracic acid.

3. The herein described method of copperizing iron in any form, consisting in immersing the iron in a bath of a suitable acid and thoroughly cleaning the iron, then immersing the cleaned iron in a solution of copper sulfate, drying the iron, passing the iron in conjunction with a flux of boracic acid through a furnace heated to the melting point of copper, and removing the iron from the furnace and placing the same in a bath of dry boracic acid to cool.

4. The herein described method of copperizing iron in any form, consisting of immersing it in an acid pickling bath in the proportion of about 1 part of acid to 10 parts of water to cleanse the same, then immersing the cleansed iron in a bath containing a solution of approximately 1 part of copper sulfate, 2 parts of sulfuric acid, ⅓ part of boracic acid, and 18 parts of water, then drying the iron so treated and placing it in a furnace in conjunction with a flux of boracic acid and heating it to the melting point of copper, and then removing and placing the iron in a bath of dry boracic acid to cool.

In testimony whereof I have hereunto set my hand in presence of two subscribing witnesses.

WILLIAM GEORGE CLARK.

Witnesses:
WILLIAM HERBERT WATERS,
WALTER CHARLES HART.